United States Patent [19]
Kensrue

[11] 3,843,866
[45] Oct. 22, 1974

[54] AUTOMATIC FILLET AND BUTT WELDING APPARATUS

[76] Inventor: Milo M. Kensrue, 11031 Cherryhill Dr., Santa Ana, Calif. 92705

[22] Filed: Oct. 2, 1972

[21] Appl. No.: 293,852

[52] U.S. Cl............................ 219/124, 219/131. F
[51] Int. Cl............................................. B23k 9/12
[58] Field of Search .......... 219/124, 125, 126, 130, 219/131 F

[56] References Cited
UNITED STATES PATENTS

| | | | |
|---|---|---|---|
| 2,480,311 | 8/1949 | Tyrner | 219/125 R |
| 2,845,526 | 7/1958 | Cameron et al. | 219/131 F |
| 3,019,327 | 1/1962 | Engel | 219/124 X |
| 3,515,844 | 6/1970 | Colarossi et al. | 219/125 R |
| 3,681,564 | 8/1972 | Hiyama et al. | 219/125 R |

*Primary Examiner*—J. V. Truhe
*Assistant Examiner*—C. Shaw
*Attorney, Agent, or Firm*—Whann & McManigal

[57] ABSTRACT

Power propelled apparatus particularly for making fillet and butt welds along a weld joint axis between adjacent surfaces of plate members and other workpieces having converging relation on a plane in right angled relation to the joint axis, in which a power propelled carriage is guidingly supported for movement in parallel relation along the joint axis, and a welding torch carried along the joint axis by the carriage is actuated with a transverse oscillatory movement between the converging surfaces, provision being made to selectively adjust the torch movement to conform substantially to a linear path or a V-path of movement over the converging surfaces in a manner to properly maintain the necessary welding voltage-ampere relationship, the torch oscillating means also being adjustable to select and vary the speed of movement and extent of dwell interval at the sides and mid-points of the weld.

10 Claims, 8 Drawing Figures

3,843,866

AUTOMATIC FILLET AND BUTT WELDING APPARATUS

BACKGROUND OF THE INVENTION

The present invention relates generally to the field of material working.

A vital need exists in today's fast developing industry for more dependable controls and apparatus for the welding together of workpieces along linear connecting seams and joints. This is particularly true in the building and shipbuilding industries where it becomes necessary in the fabrication of frameworks, hull structures, partitions, compartments, and the like, to utilize fillet and butt welds, and especially where the weld joint axis is essentially vertical.

The difficulties and problems attending the making of fillet and butt welds, arise primarily from the fact that the weld is made by transverse passes across the joint axis between angularly positioned converging surfaces such as would be formed by the letter "V." Attempts have heretofore been made to design welding apparatus which would automatically produce this type of weld. The results have in the main been unsatisfactory for the reason that the welding tip was oscillated in a straight line or with a slight radial curvature from one side surface to the other. The resulting welds were not satisfactory for the reason that the weld was not being tied into the root of the joint at the juncture of the converging surfaces.

Further, when a constant voltage welder is utilized, the work distance may vary as much as three-fourths of an inch from the oscillation path between the weld faces to the root of the weld. As a consequence, the conditions for proper welding are not maintained with respect to the voltage-ampere relationship.

A skilled hand-welder in making fillet and butt welds of the above described character will make certain manipulations in using MIG or wire-fed torch to keep the weld even in and tie the root in so as to avoid making a bad weld, which, if found, would have to be removed. The problem, of course, is to find good trained welders who can make a quality weld that looks good and will pass inspectioon, and this can only be definitely determined by an X-Ray examination of the weld.

The apparatus of the present invention is designed to simulate the movements of the skilled welder, and once the conditions are set, the welds will be automatically repeated time-after-time. One man can easily attend four machines without difficulty.

According to the present invention, the actuating mechanism for the torch is arranged to move the torch in an angular V-path of either 60° or 90°, whichever is required, and if a larger weld is needed after the first weld has filled the V-part of the joint, the mechanism can then be easily set to move over the outer surface of the first weld in a straight line or slightly curved path.

The actuating mechanism is further selective and adjustable to provide dwell positions at the sides and center of the weld joint, the time interval at the dwell being adjustable, depending upon the prevailing conditions.

SUMMARY OF THE INVENTION

The present invention relates generally to power propelled apparatus for attachment to a workpiece, and movement therealong while automatically carrying out a work operation, and particularly a welding operation for making fillet and butt welds wherein the welding torch is moved across the weld joint axis with an oscillatory motion as the apparatus carries the welding torch linearly along the joint axis.

Having in mind the difficulties heretofore encountered in attempting to build welding apparatus of the character disclosed herein, it is one object of the herein described invention to provide apparatus for automatically producing fillet and butt welds between angularly disposed surfaces of plates and other workpieces, and in which the torch or welding tip is moved across the longitudinal axis of the joint with an oscillatory movement as it is being continuously carried along the joint axis.

A further object is to provide apparatus according to the foregoing object, in which the welding tip or torch is selectively adjustable to oscillate in a V-path of movement or a substantially linear path of movement.

A further object of the invention is to provide welding apparatus of the herein described type in which the oscillatory movement and movement of the apparatus along the weld joint is selectively adjustable to vary the length of oscillations and speeds of travel.

Another object is to provide in welding apparatus a unique mechanism for oscillating the welding top or torch during the welding operation.

Still another object is to provide in such apparatus driving mechanism for the welding tip or torch which is selectively controllable to provide dwell points at one or more positions of the joint weld, and which may include the weld sides, and/or center of the weld, and wherein the dwell interval is selectively adjustable.

It is also an object to provide novel guide means for powered welding apparatus, and means for positioning and affixing the guide means to a workpiece or workpieces.

Further objects of the invention will be brought out in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only.

DESCRIPTION OF THE DISCLOSED EMBODIMENT

Referring more specifically to the drawings, the apparatus of the present invention is illustrated herein as being embodied in apparatus for producing fillet and butt welds automatically, and particularly in connection with vertically extending welded joints. Although the apparatus will be described with reference to the production of substantially vertical welded joints, it is to be understood that the production of horizontally extending joints are within the concept of the present invention.

Figure 1:
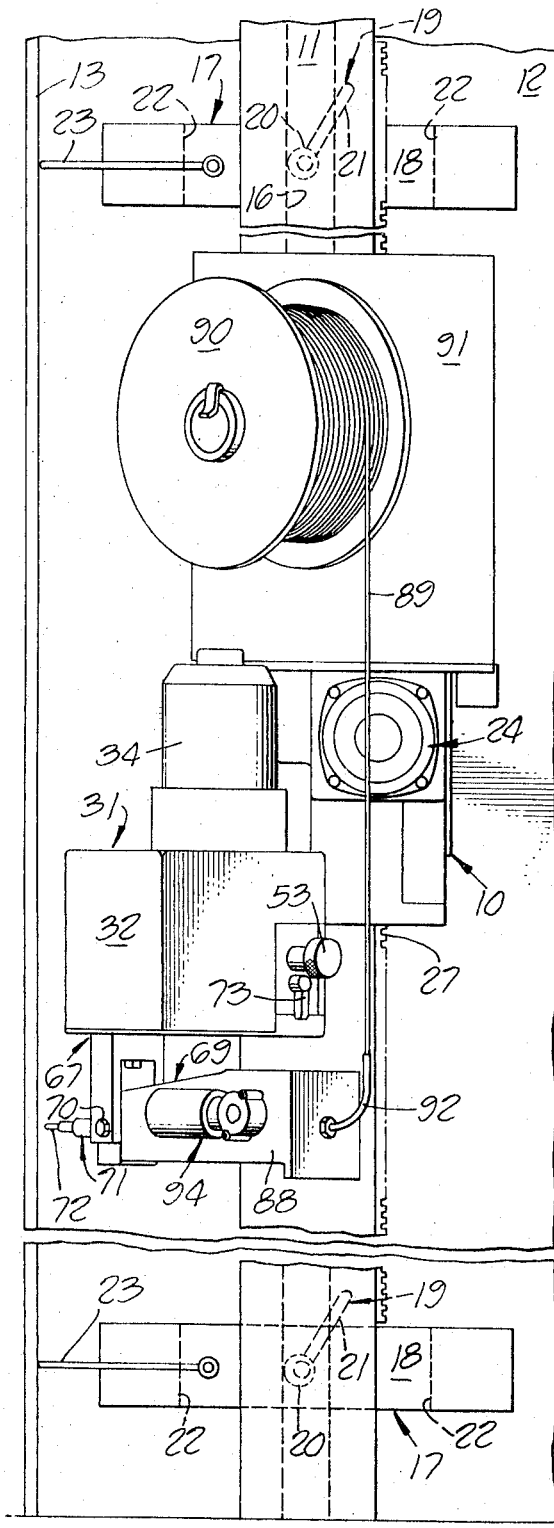
FIG. 1 is a side elevational view of welding apparatus embodying the features of the present invention.

As shown in FIG. 1, the welding apparatus is embodied in a power driven carriage structure in which a main frame, as generally indicated at 10, is guidingly moved along a guide rail, as generally indicated at 11, this guide rail being removably mounted on a workpiece so as to guide the welding apparatus along the weld joint. For illustrative purposes, the weld joint is in this case shown as being the corner angle between a pair of workpieces which comprise wall panels 12 and 13 in right angled relation and which are to be welded at the angle by means of a fillet type weld. In the case of a butt weld, the plate members would be positioned coplanar and have their adjacent edges beveled to provide surfaces at the weld joint which are in 60° angular relation.

The guide rail is in the form of an elongate member having a longitudinally extending groove 14 formed in each of its side edges between spaced flanges 15a and 15b. Along the back face of the guide rail there is also provided a central longitudinally extending inverted T-groove 16.

The guide rail is removably anchored to the workpiece, for example, the wall plate 12, by means of a plurality of magnetic brackets 17 which are adjustably positionable at desired locations along the guide rail. As shown, each magnetic bracket includes a plate member 18 which is formed intermediate its ends with an appropriate tongue portion adapted to slidably fit the groove 16 and support the plate member 18 in transversely extending right-angled relation to the axis of the guide rail. A locking member 19 with a pivoted eccentric camming head 20 is manually operable by a handle 21 into locked and unlocked positions. The outermost ends of the plate 18 respectively support a magnet 22 which projects rearwardly of the plate and is adapted to make face engagement with the workpiece. In order to properly position the guide rail with respect to the associated wall plate 13, each of the magnetic brackets 17 is provided with an appropriate gauging bar 23, the outermost end of which is adapted to bear against the plate 13 and thus orient the position of the guide rail. In FIG. 1, the guide rail is supported by a magnetic bracket at the top and bottom respectively.

The carriage structure is propelled along the guide rail by appropriate power driving means which includes an electric motor 24 mounted on the main frame 10 and having its drive shaft 25 connected with a driving pinion 26 positioned in one of the grooves 14 of the guide rail in meshed relation to the teeth of a linear rack 27 mounted in and extending along the bottom of the groove. The motor shaft also carries rollers 28a and 28b respectively on opposite sides of the pinion 26 for bearing engagement against the adjacent flanges 15a and 15b of the guide rail. Also, in spaced relation below the rollers 28a and 28b, a stabilizing roller 29 is rotatably mounted, this roller having end flanges 30a and 30b for bearing engagement with the flanges 15a and 15b of the guide rail and to support the roller in a position straddling the teeth of the rack 27. On the opposite edge of the guide rail, guide rollers (not shown) are carried by the main frame and extend into the groove 14 on this side of the guide rail, these rollers preferably being positioned opposite the pinion 26 and the roller 29. As thus mounted, the carriage structure is movable in guided relation to the weld joint by its movement along the properly oriented guide rail.

Figure 3:
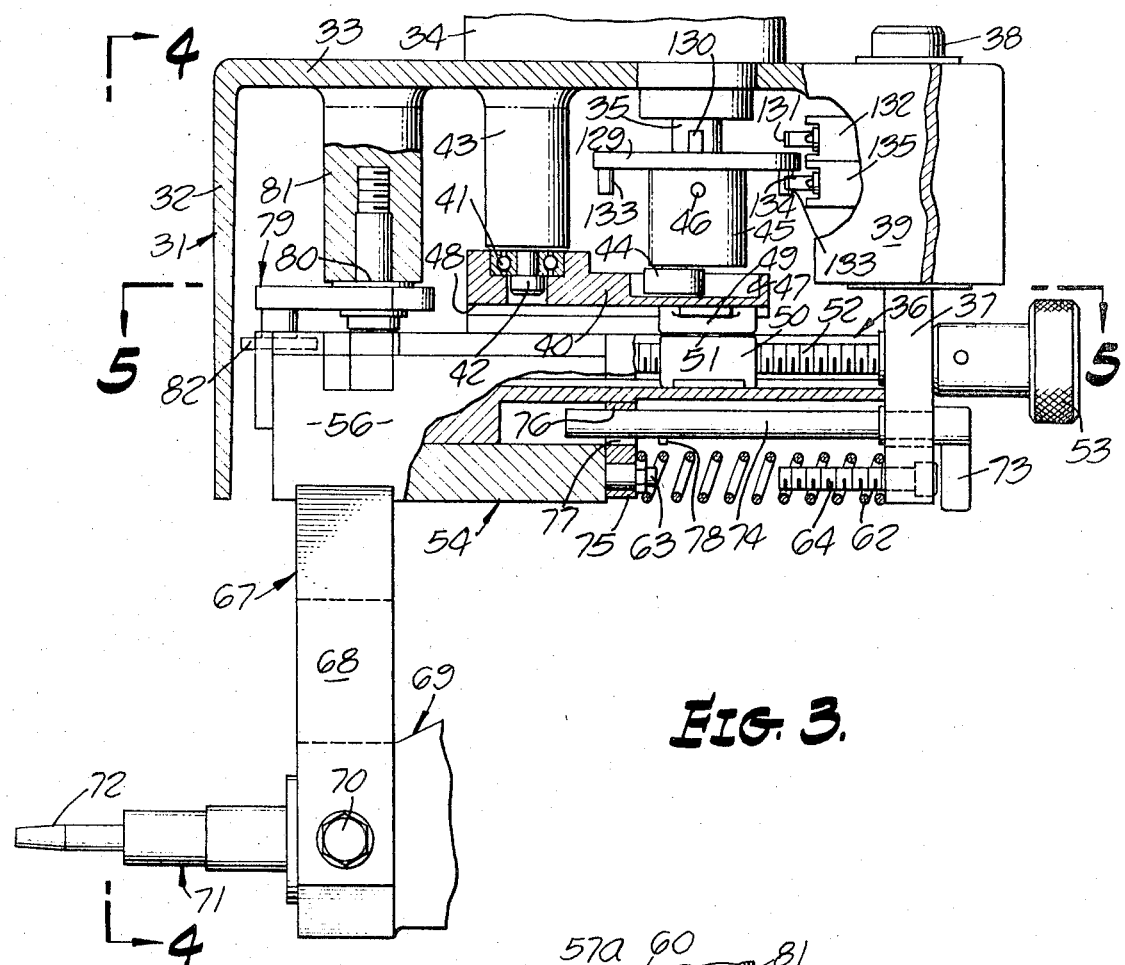
FIG. 3 is an enlarged fragmentary side elevational view, partly in section, disclosing the cooperative relationship of components of the torch oscillating mechanism.

During the linear movement of the torch tip along the weld joint axis as a result of the linear movement of the carriage structure on the guide rail, the torch tip is simultaneously oscillated by means of oscillating mechanism within a housing as generally indicated at 31, this housing being attached to and depending from the main frame 10. As best shown in FIG. 3, the housing has a surrounding skirt 32 which depends from the outer margin of a top wall 33 that serves as a support for the various components of the mechanism and an externally mounted oscillator motor 34 which is geared down to produce a rotation of the order of 0 - 30 r.p.m. of its driving shaft 35 which is positioned within the housing.

An elongate motion guide arm 36 within the housing is secured at one end to a supporting bracket 37 at the lowermost end of a pivot member 38, this pivot being rotatable in a bearing 39 provided by a portion of the housing 31.

As shown in FIG. 3, the guide arm 36 is driven in its oscillatory movement by a driving arm 40 which is pivotablly supported at one end by a anti-friction bearing 41 attached as by a retaining screw 42 at the lowermost end of a boss 43 depending from the wall 33. The driving arm is swung through a fixed angle as determined by the throw of an eccentrically mounted roller 44 carried by a coupling element 45 secured to the shaft 35 as by a retaining pin 46. The roller 44 is seated and movable within an elongate groove 47 in the upper surface of the driving arm. Extending along the under surface of the driving arm 40 is an axially extending T-groove 48 in which there is a slide member 49.

Provision is made for adjustably varying the extent of oscillation of the guide arm 36 for weld joints of different widths. For this purpose, the slide member 49 is adjustably positionable in the slot 48 by means of a nut 50 having a pivotal connection 51 with the slide member and a threaded connection with a lead screw 52 which is rotatably supported in the bracket 37 and connected with a manual adjusting knob 53.

Figure 4:
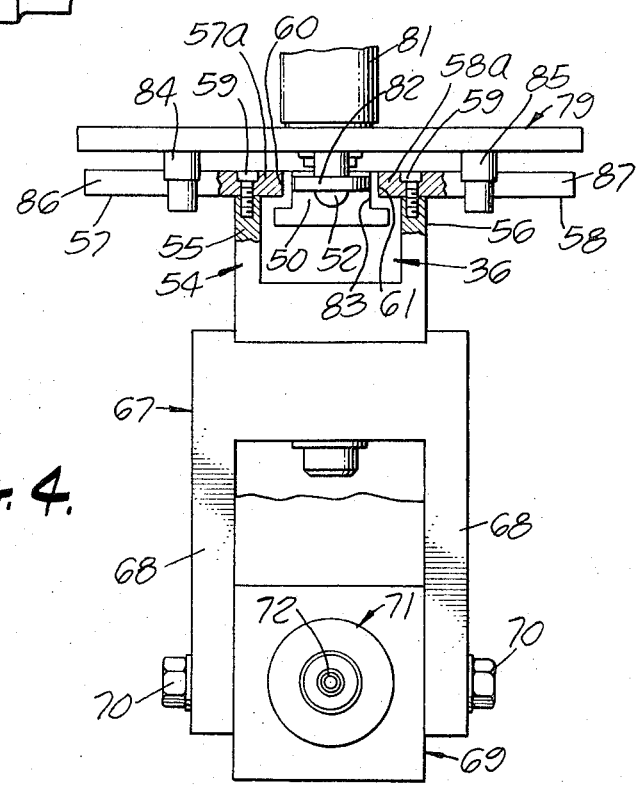
FIG. 4 is a view of the same as seen along line 4—4 of FIG. 3.

At its unpivoted end, the motion guide arm 36 carries a slidably mounted head frame 54 of generally U-shaped configuration, as shown in FIG. 4, with side flanges 55 and 56 which engage the opposite sides of the guide arm. The head frame is retained in mounted position by means of cam follower oppositely extending wing plates 57 and 58 which are secured to the upper edges of the flanges 55 and 56 as by screws 59 in such a position that the inner edge margins 57a and 58a of the plates will be seated in associated guiding grooves 60 and 61 formed along the opposite sides of the guide arm. The head frame 54 is normally urged toward the outer end of the arm 36 by means of a coiled compression spring 62 having one end seated over a retaining pin 63 carried by the head frame and its other end extending over an elongate retaining screw 64 at the lowermost end of the bracket 37. Outward movement of the head frame by the spring 62 is limited by abutment means which will later be described in detail.

The head frame 54, as shown in FIGS. 3 and 4, carries a torch supporting yoke 67 of generally inverted U-shaped configuration and has spaced legs 68, which straddle and are pivotally secured to one end of a welding head structure 69 by means of pivot bolts 70, which permit tilting adjustment of the welding head structure and may be tightened to retain the head structure in adjusted position.

The welding head structure includes a welding torch as generally indicated at 71 and which has a welding tip which is movable in a welding path as determined by the oscillations of the motion guide arm 36 and the position of the head frame thereon. It will be apparent that if the head frame is held against sliding movement on the motion guide arm 36, the tip 72 will merely be oscillated across the weld joint in a substantially lineal or slightly curved path. Where such a welding path is desired, provision is made for locking the head frame 54 against sliding movement. For use purpose, there is provided a locking lever 73 with an elongate shank 74 which is rotatably supported adjacent the lever in the bracket 37, and at its other end is supported in a bearing member 75 secured to the head frame 54. The bearing member has an opening 76 through which the adjacent end of the elongate shank extends. The bearing member is grooved as indicated at 77 in the wall of the opening 76 for the passage of a latch pin 78 carried by the shank, when the head frame is moved toward the right, as shown in FIG. 3. Once the pin 78 is positioned on the left side of the bearing member, the locking lever may be turned to move the pin 78 out of alignment with the slot 77 so as to retain the head frame against movement to the left under the force of the spring 62.

Figure 5:
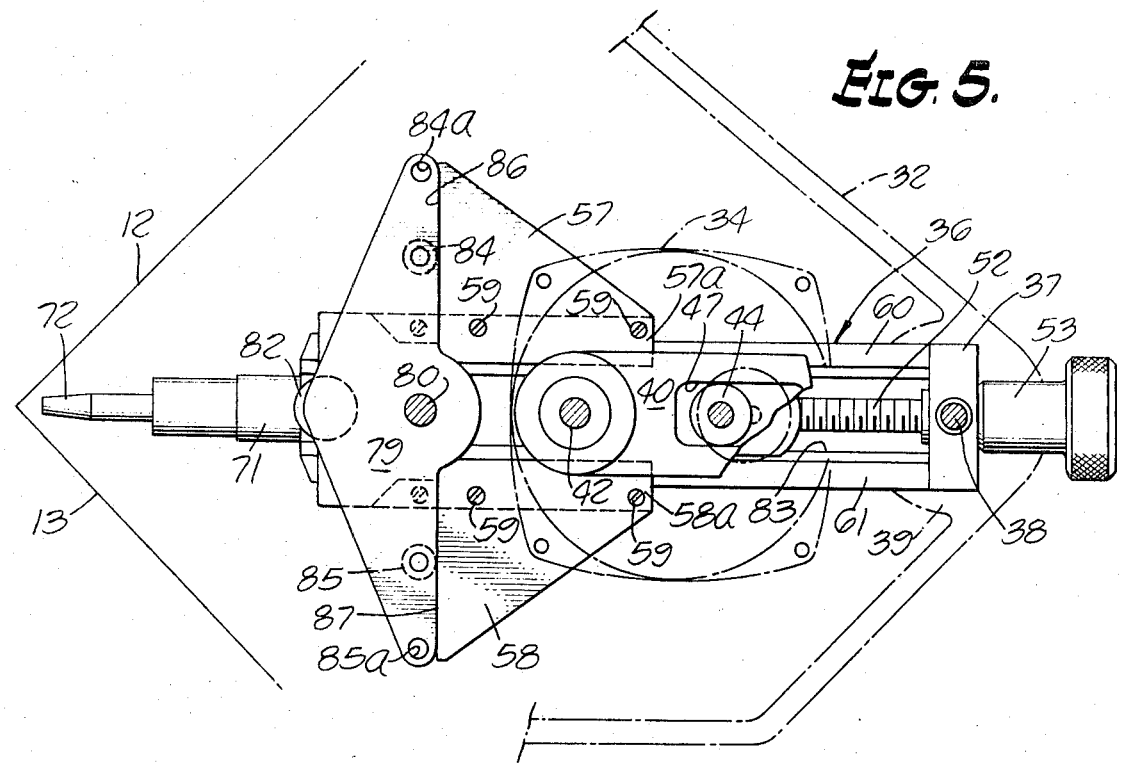
FIG. 5 is a transverse section taken substantially on line 5—5 of FIG. 3, the parts being in a mid-position of oscillatory movement.
Figure 6:
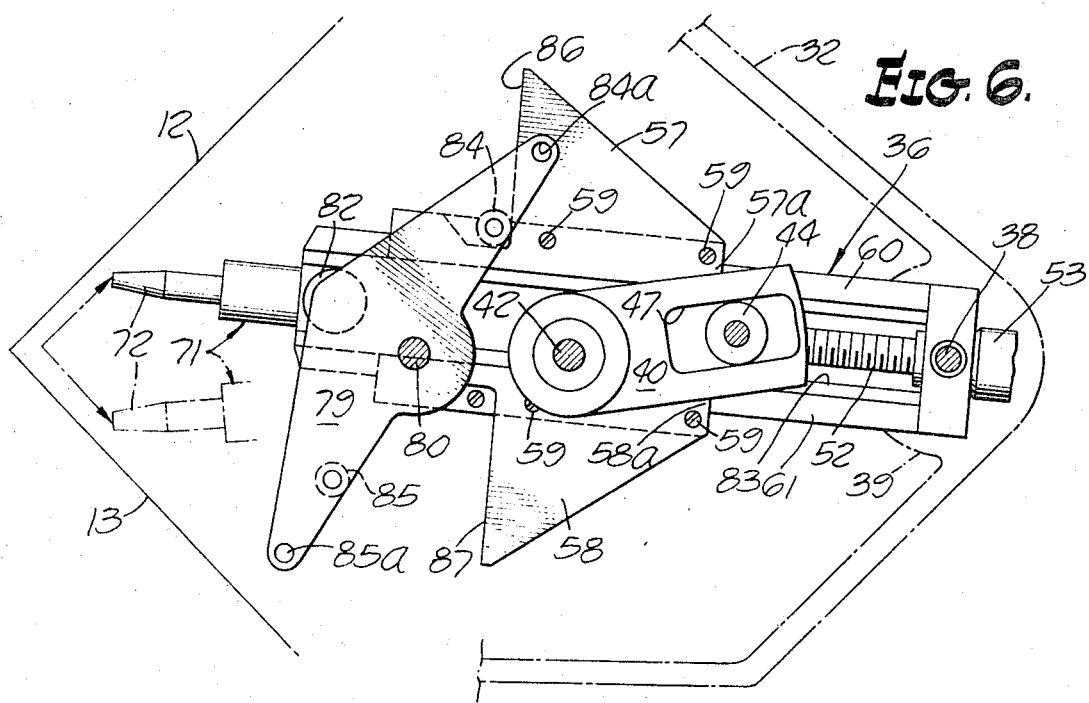
FIG. 6 is a similar view showing the parts in an operative position, when the torch is at the limits of its oscillatory movement.

When it is desired to have the welding tip follow a V-path of movement along converging surfaces of the workpieces to be welded, the oscillatory movement of the motion guide arm 36 is combined with a rectalinear movement of the head frame 54 which is provided in response to the oscilatory movement of the guide arm in such a manner as to produce the V-path of movement rather than the simpler oscillatory movement as previously described above. For such purpose, there is provided a double-ended rocker cam 79 which is pivoted intermediate its ends for rocking movement on a pivot 80 at the lower end of a boss 81 depending from the top wall 33. Intermediate the ends of the rocker cam, the cam is connected with the motion guide arm 36 by means of a roller 82 supported on the under side of the rocker 79 in outwardly spaced relation to the pivot 80, this roller being movable within longitudinally extending groove 83 formed in the upper side of the motion guide arm 36. With the connection just described, it will be apparent that as the motion guide arm is swung in either direction from its normal mid-position, the rocker cam will be tilted or rocked in a clockwise or a counter-clockwise direction in accordance with the swinging movement of the motion guide arm. Movement of the rocker cam is transmitted to the wing plates 57 and 58 by means of pins 84 and 85 which are adapted to engage respectively with associated abutment edges 86 and 87 of the wing plates 57 and 58. The camming action acts to slidably move the head frame 54 on the arm 36 away from its outer end against the force of the spring 62. Moreover, as the rocker cam is returned to its midposition, the force of this spring 62 operates to return the head frame by movement in a direction towards the outer end of the arm 36. Thus, the oscillatory movement of the arm 36, and the linear movement of the head frame under the action of the rocker cam coact to produce a composite movement which will carry the welding tip 72 along an angular V-path during the welding operation. With the pins 84 and 85 mounted in the position as shown in FIGS. 5 and 6, the angular V-path of movement will be 90°, whereas if the pins are moved outwardly to the positions indicated at 84a and 85a the angle of the V-path will be 60 degrees instead of 90°.

Figure 7:
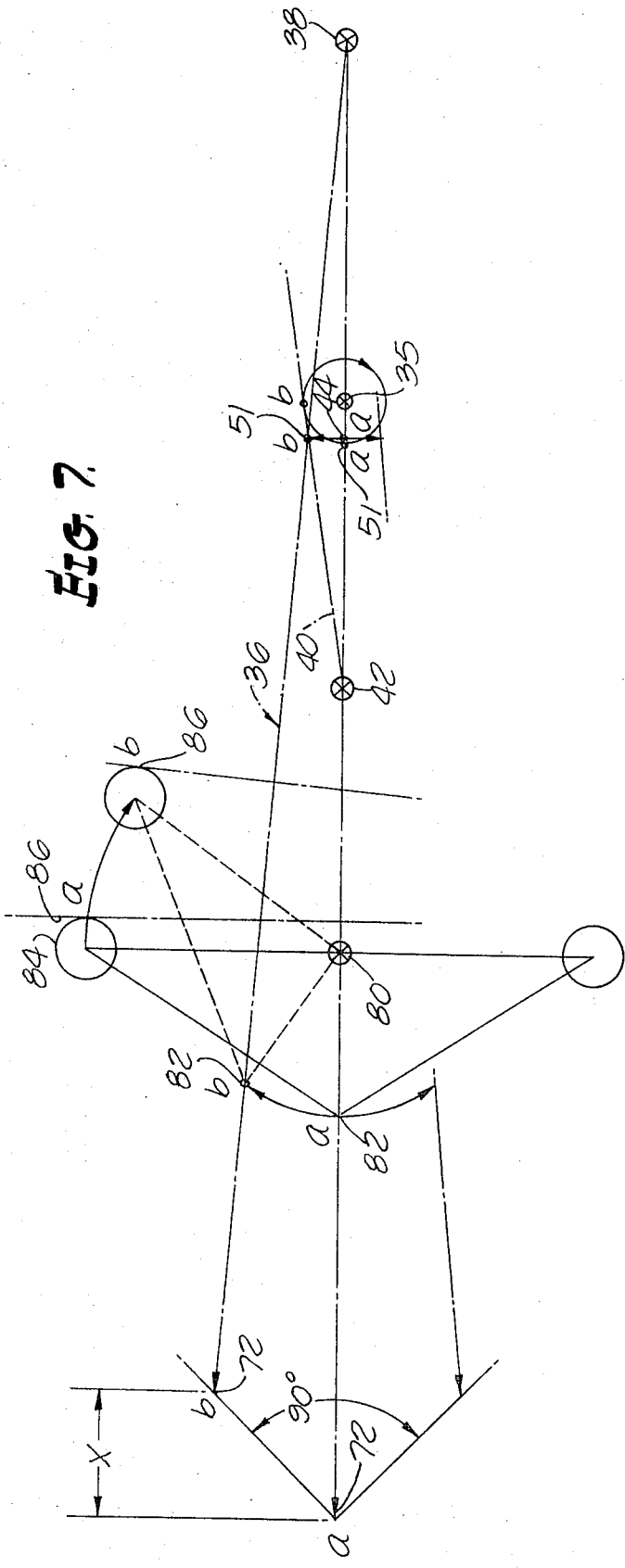
FIG. 7 is a view schematically illustrating the operation of the oscillatory mechanism.

In FIG. 7 the action of the oscillating mechanism is diagrammatically illustrated, and graphically shows the coaction of the oscillatory movement of the motion guide arm 36 and the linear sliding movement of the head frame 54 thereon to produce movement of the welding tip 72 along a V-path over the converging surfaces at the weld joint. Assuming an initial position of the tip 72 at the point of convergence of the surfaces, as indicated at a, swinging movement of the driving arm 40 about its pivot 42 to move the pivotal connection 51 to position b will swing the arm 36 about its pivot 38 to bring the motion guide arm to its extreme limit of swing.

During this swinging movement of the arm 36, the roller 82 will move from its position a to its position as indicated at b, and in so doing will move the pin 84 against the abutment edge 86 so as to slide the head frame 54 therealong to a position in which the abutment edge 86 will be disposed at its position as indicated at b. It will thus appear that the combined swinging movement of the motion guide arm 36, and this linear movement of the head frame 54 will coact to retract the tip 72 through a distance as indicated at X. Swinging movement of the arm 36 in the opposite direction from its medial axis will function in the same manner.

Figure 2:
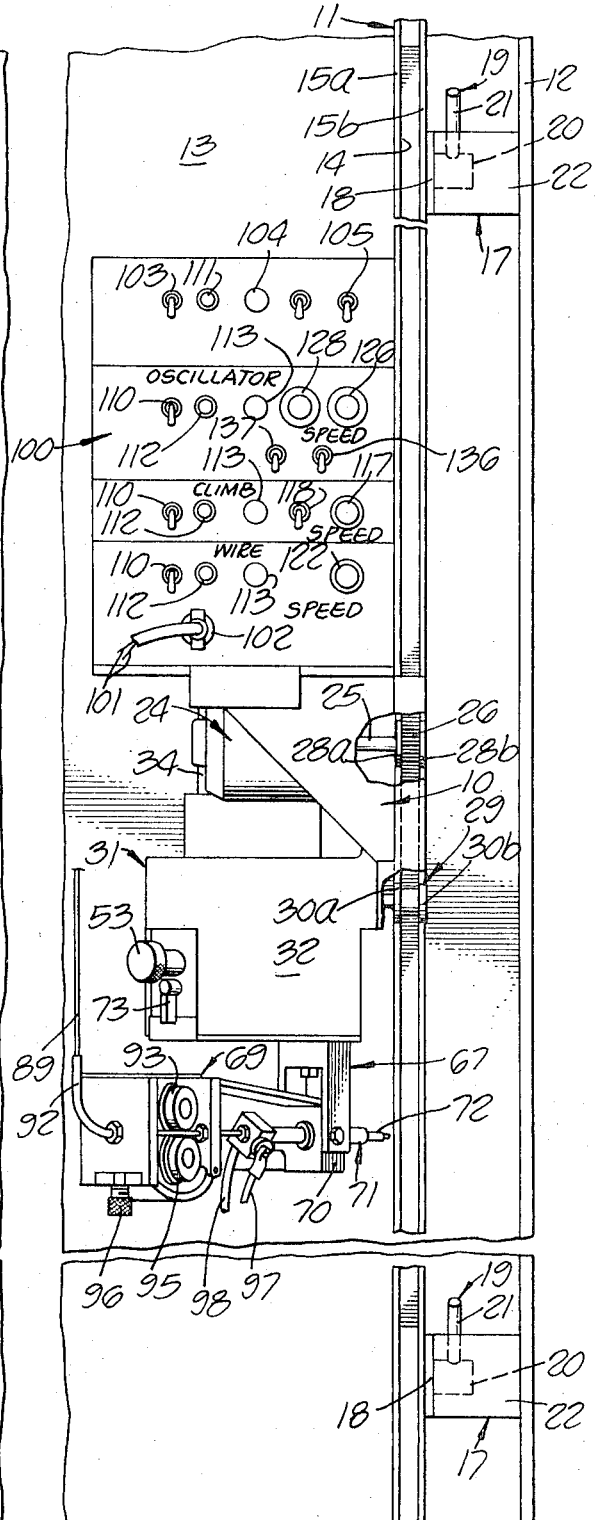
FIG. 2 is similar side elevational view as the apparatus appears when viewed from a side in right angled relation to that as seen in FIG. 1.

The welding head structure 69 may vary as to its general configuration, but irrespective of such configuration the structure is arranged to operatively support the conventional components as usually provided in such welding apparatus. As illustrated, the structure includes an elongate box-like frame 88 which is swingably pivoted on the pivot bolts 70, for swinging movement in the supporting yoke 67. Welding wire 89 is arranged to be supplied from a reel 90 which is rotatably supported upon an upwardly extending frame structure 91 carried by the main frame 10. The welding wire 89 is carried through a wire guide tube 92 into an end of the frame 88, the wire then passing through a pair of feed rollers which comprise a driving roller 93 driven from a motor 94, and an idler roller 95 arranged for adjustment by appropriate means including an adjusting knob 96. The welding wire 89 is carried to the torch 71 and thence to the welding tip 72. Provision is made for supplying welding current to the torch through a supply cable 97, and when a gas is required for the welding operation, such gas is conducted to the torch through a supply conduit as indicated at 98. As shown in FIG. 2, the frame structure 91 provides a housing for the control equipment and mounts the control panels as generally indicated at 100 for the main electric supply, oscillator motor 34, climb motor 24 and wire feed motor 94.

Figure 8:
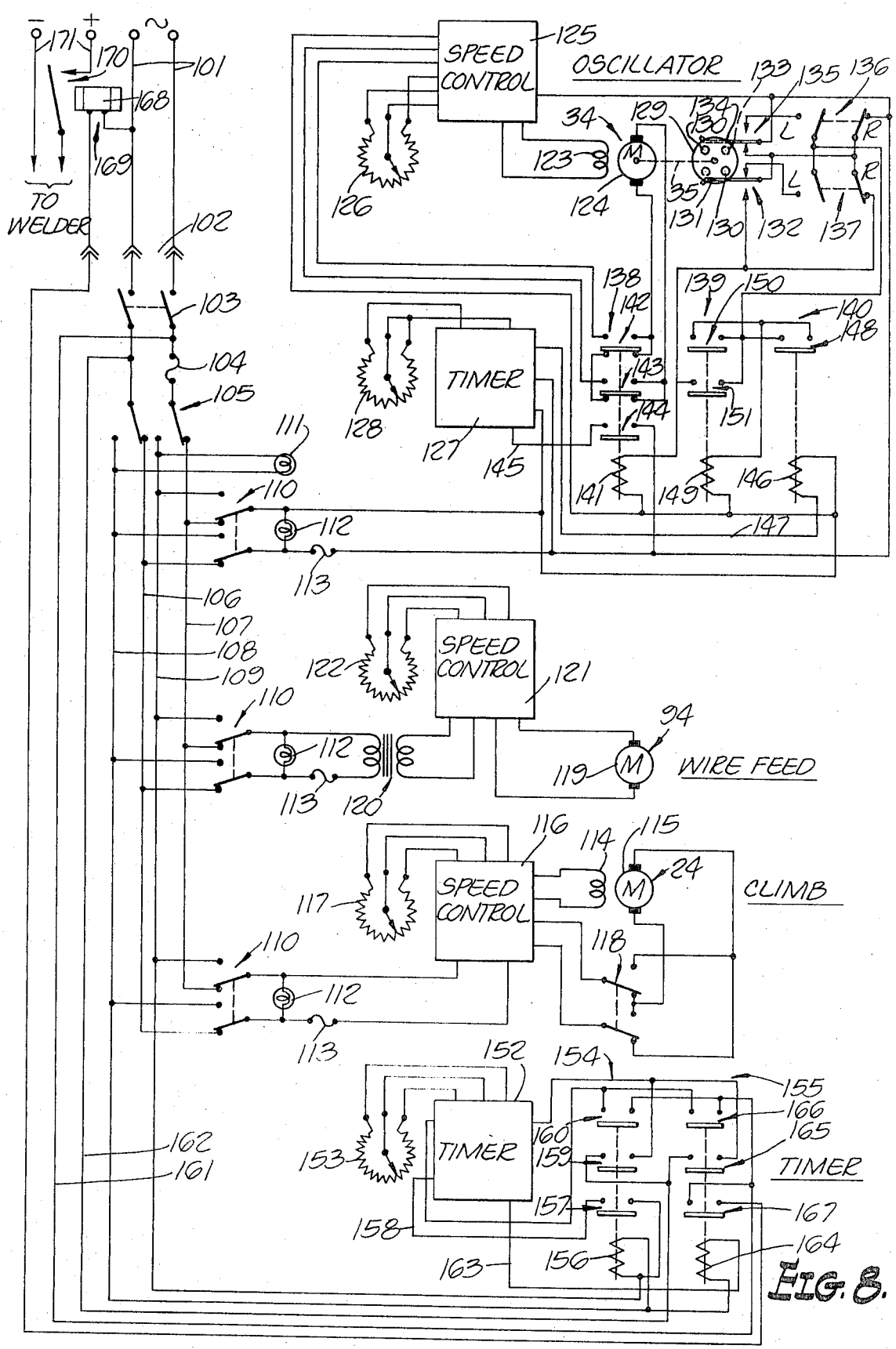
FIG. 8 is a schematic diagram of the apparatus control mechanism.

The various controls and control circuitry will now be discussed, reference being had to FIG. 8. Electric supply for the control components is shown as comprising alternating current supply conductors 101 at an appropriate voltage such as 110 volts. The electric supply is connected through a plug connection 102 mounted on the control panels as indicated in FIG. 2. The supply circuit is first conducted to a main switch 103 and thence through a main fuse 104 to a double-pole double-throw switch 105 having one position which connects the supply to a test circuit formed by the conductors 106 and 107, and in another position which connects the supply with a firing circuit formed by conductors 108 and 109. A double-throw branch connecting switch 110 is used for the branch controlling circuit for the oscillator, climb and wire feed circuits respectively, and in one position connects the circuit with the test circuit and in the other position connects the circuit of the component with the firing circuit. This permits testing and adjustment of each component circuit prior to its connection to the firing circuit for operation during welding. An indicating lamp 111 is connected to show when the switch 105 is connected to the firing position. An indicating lamp 112 and protective fuse 113 are provided for each of the control component circuits.

The climb motor 24 is of the alternating current type having a field winding 114 and armature 115. The branch circuit is in this case connected with a speed control unit 116 which incorporates an adjusting potentiometer 117 and has connections with the field winding 114, and the armature 115 through a reversing switch 118. This control provides appropriate flexibility for obtaining the required speed of movement of the apparatus along the guide rail during the welding operation.

The wire feed motor 94 is of the direct current type having an armature 119. The branch circuit for this control component is connected with a transformer 120, the secondary winding of which feeds a speed control unit 121 which includes an adjusting potentiometer 122 and has a feed connection to the armature 119.

The oscillator motor 34 is also illustrated as being an alternating current motor having a field winding 123 and armature 124. A speed control unit 125 is also provided in this case and includes an adjusting potentiometer 126 and a connection from the unit to the motor field 123. As thus far described, the speed of oscillation of the motion guide arm 36 is readily varied as desired.

A main feature of the control of the oscillator motor resides in the provision of control which permits selective control of dwell intervals at the center and side limits of the V-path of movement of the welding tip. The extent of dwell is adjustably variable by means of a timer unit 127 which includes an adjusting potentiometer 128. In practice this potentiometer can vary the dwell time interval in the order 0–7 seconds in order to permit proper tying in of the weld at the center and sides of the path of movement of the welding tip transversely of the joint.

The dwell positions are coordinated with the oscillatory movement of the motion guide arm by means of a disc member 129 (FIG. 3) connected for rotation with the driving shaft 35 of the oscillator motor. This disc carries a pair of upstanding pins 130 in diametral relation, these pins being operative to engage an actuator 131 of a micro-switch 132 for controlling the dwell at the center of the V-path of movement of the welding tip.

A pair of depending pins 133 similarly in diametral relation, but displaced 90 degrees from the pins 130, are utilized to engage an actuator 134 of a micro-switch 135 to control the dwell at the sides of the V-path of movement of the welding tip.

A pair of double-pole double-throw manually operable toggle switches 136 and 137 provide for selection of the desired dwell positions. For example, with both of these toggle switches moved to the right, as shown in full lines, there will be no dwell points. If the switch 136 is moved to the left, leaving the switch 137 in its right position, side dwells only will be obtained. This setting would be desirable for a narrow joint weld. If the toggle switch 137 is moved to the left, leaving the switch 136 in its right position as shown, only center dwells will be obtained. If both switches 136 and 137 are moved to their left position, dwell points will be obtained at both the center and sides. This would be used primarily in the case of a wide weld.

The dwell time is coordinated with the starting and stopping of the oscillator motor by means of a brake relay 138 and timer interlocking relays 139 and 140. The brake relay has an operating coil 141 and switching contacts 142 and 143 which are operative in the de-energized condition of the relay to connect the armature 124 to a short-circuiting path. When the relay is energized, the contacts connect the armature with the speed control unit 125. Contacts 144 are connected in a triggering circuit via conductor 145 to the timer and triggers the timer into a timing operation when the contacts 144 are opened.

The coil 141 of the brake relay is arranged to be energized, when the branch circuit is energizeed by the closure of switch 110. Stoppage of the motor 34 is determined by the operation of the micro-switches, and at the end of the set dwell time, relay 140 will be closed by the energization of its actuating coil 146 by the timer through a conductor 147. Closure of contacts 148 of the relay 140 completes a circuit to energize the actuating coil 149 of the relay 139. Upon energization,on, the relay 139 closes contacts 150 of an interlocking energizing circuit to its actuating coil 149. At the same time, contacts 151 will be closed to provide an energizing circuit to the actuating coil 141 of relay 138, whereupon its operation will again energize the armature 34 from the speed control 125. As the motor continues to run, the appropriate micro-switch will operate to interrupt the energizing circuit of relay 139, which drops out. The relays are then in a condition to repeat the cycle of stopping the motor and providing a time delay dwell at the positions as determined by the selective switches 136 and 137.

A further feature of the control resides in the provision of means for continuing the supply of current to the welding wire of the welder for a period of time after the firing switch 105 is operated to open the firing circuit, in order to assure burning the wire back at the weld puddle.

For this purpose, there is provided a timer unit 152 which is adjustable to provide an appropriate time delay as determined by the setting of an adjusting potentiometer 153. A primary relay 154 and secondary relay 155 determine the sequence of operations in a manner which will now be described. When the firing switch 105 is closed to energize conductors 108 and 109 to initiate a welding operation, the actuating coil 156 of the primary relay is energized, whereupon this relay closes its contacts. Closure of the contacts 157 serves to connect one side of its actuating coil circuit through a conductor 158 with the timer unit. At the same time, closure of contacts 159 and 160 operate to connect conductors 161 and 162 with the timer unit, these conductors being connected with the electric supply circuit ahead of the firing switch 105 so that when the firing switch is opened, the timer will still be energized. Upon energization of the timer, it operates to energize a conductor 163 so as to complete an energizing circuit to the actuating coil 164 of the relay 155 which will now close its contacts. Contacts 165 and 166 are connected in parallel with the contacts 159 and 160 of relay 154. In addition, contacts 167 are provided which, upon closure, will connect the conductor 161 with one side of an actuating coil 168 of a contactor 169, the other side of this coil being in circuit with the other side of the supply circuit. Energization of the coil 168 causes the contactor to close contacts 170 to establish a direct current circuit 171 to the welder and the welding wire therein.

When the firing switch 105 is operated to disconnect the conductors 108 and 109 of the firing circuit, the actuating coil 156 of the relay 154 will be deenergized and the relay will operate to open its contacts. After the lapse of the pre-set time interval of the timer as set by the adjustment of the adjusting potentiometer 153, the timer will operate to deenergize the actuating coil 164 of relay 155, which then opens its contacts and interrupts the energizing circuit to the contactor 169. The contactor then opens its contacts to disconnect the flow of supply current to the welder. Due to the time delay opening of this supply circuit to the welder, the welding wire at the puddle will be burned back.

From the foregoing description, it is believed that it will be appareciated that the heretofore outlined objects of the invention will be attained, and that the apparatus embodying the described features provides inherent advantages in the carrying out of the particular types of welding operations on the associated work pieces.

Various modifications may suggest themselves to those skilled in the art without departing from the spirit of my invention, and, hence, I do not wish to be restricted to the specific forms shown or uses mentioned, except to the extent indicated in the appended claims.

I claim:

1. Welding apparatus operable to provide a continuous weld along a weld joint axis between adjacent surfaces having converging relation on a plane at a rightangle to the weld joint axis, comprising:
   a. a power drive carriage structure;
   b. means supporting said carriage structure for guided movement along said joint axis;
   c. a welding torch mounted on said carriage structure and being movable therewith along the joint axis including a welding tip; and
   d. mechanism for oscillating the welding tip in successively reversed paths of movement transversely of the joint axis, while moving said carriage along said joint axis, said mechanism comprising:
   a guide arm pivoted at one end for swinging movement;
   a head frame supporting said torch and being slidable in a linear path on said guide arm;
   a spring normally urging the head frame and torch towards a limit position of movement at the free end of the guide arm; and
   means operable in response to oscillatory swinging movement of said guide arm and coacting with said spring to vary the position of said head frame on said guide arm in a manner such that the combined oscillatory and linear movement of the head frame will conform the tip oscillating movement to a V-path.

2. Welding apparatus according to claim 1, wherein the means coacting with the spring to vary the position of said head frame comprises a rocker cam.

3. Welding apparatus according to claim 2, including means for varying the cam action to selectively provide V-paths of movement of 60° and 90° respectively.

4. Welding apparatus according to claim 3, in which the head frame carries a follower plate and the means for varying the cam action comprises selectable pins on the rocker cam for engaging the follower plate.

5. Welding apparatus according to claim 1, including means for releasably locking said head frame in a fixed position on said guide arm and in which the means coacting with the spring to vary the position of said head frame is rendered ineffective, whereby the tip oscillating movement will be conformed substantially to a linear path.

6. Welding apparatus according to claim 1, including a driving arm having one end swingably mounted on a fixed pivot, power means for oscillating said driving arm including a connected rotatable eccentric, and an adjustable variable throw connection between said driving arm and said guide arm, whereby the lateral extent of the tip oscillations is variable to provide welds of different widths.

7. Welding apparatus according to claim 6, including means for selectively effecting a dwell characteristic in the movement of the tip at the sides and axis of the weld joint, and means for varying the dwell time interval.

8. Welding apparatus operable to provide a continuous weld along a weld joint axis between adjacent surfaces having converging relation on a plane at a rightangle to the weld joint axis, comprising:
   a. a power driven carriage structure;
   b. means supporting said carriage structure for guided movement along said joint axis;
   c. a welding torch mounted on said carriage structure and being movable therewith along the joint axis including a welding tip; and
   d. mechanism for oscillating the welding tip in successively reversed paths of movement transversely of the joint axis, while moving said carriage along said joint axis, said mechanism comprising:
   an electric motor having an armature energizing circuit;
   switching means controlled by the rotation of said motor armature for disconnecting said armature from said energizing circuit and effecting a braking action to stop the motor at a predetermined dwell position in the oscillation movement of the torch tip; and timing means activated by said switching means for reestablishing connection of said armature with said energizing circuit after a predetermined delay interval.

9. Welding apparatus according to claim 8, wherein said switching means and timing means are operable at a plurality of predetermined dwell positions.

10. Welding apparatus according to claim 8 including means for adjustably varying the delay interval of said timing means.

* * * * *